United States Patent [19]
Robinson

[11] 3,746,388
[45] July 17, 1973

[54] CARGO CARRYING VEHICLE CONSTRUCTION

[75] Inventor: Merritt A. Robinson, Marin County, Calif.

[73] Assignee: Fieldhome Equipment Corporation, San Francisco, Calif.

[22] Filed: June 30, 1971

[21] Appl. No.: 158,474

[52] U.S. Cl............ 296/28 M, 52/173, 52/287, 52/288, 52/616, 52/620, 105/409, 296/31 P
[51] Int. Cl.............................................. B62d 33/04
[58] Field of Search ............... 296/24 B, 28 M, 29, 296/31 P; 105/409, 422; 52/287, 288, 173, 309, 616, 743, 620

[56] References Cited
UNITED STATES PATENTS

| | | | |
|---|---|---|---|
| 3,380,216 | 4/1968 | Spence | 296/28 M X |
| 3,156,503 | 11/1964 | Chieger | 296/28 M |
| 2,815,722 | 12/1957 | Dean | 105/409 X |
| 3,470,058 | 9/1969 | Heffner | 296/31 P X |
| 2,991,116 | 7/1961 | Andrews | 296/28 M |

FOREIGN PATENTS OR APPLICATIONS

| | | | |
|---|---|---|---|
| 1,127,915 | 9/1968 | Great Britain | 296/31 P |
| 651,504 | 10/1962 | Canada | 296/28 M |
| 704,032 | 2/1965 | Canada | 296/28 M |

Primary Examiner—Leo Friaglia
Assistant Examiner—Leslie J. Paperner
Attorney—Manfred M. Warren, Robert B. Chickering et al.

[57] ABSTRACT

A cargo carrying vehicle construction employing foamed floor, side wall and roof panels to form the body defining the cargo carrying space is disclosed. The floor panel incorporates a rub rail along the edge thereof and the roof panel incorporates a roof edge element, both which are formed for securement to their respective panels by adhesive materials. The rub rail and roof edge element are formed for receipt and securement of a side wall panel thereto, with the same side wall panel being invertible for use on either side of the vehicle. Additionally, the rub rail and roof edge element are formed with openings to allow foaming of the floor and roof panels in place with the respective edge elements acting to contain the foam. Both the rub rail and the roof edge element may be used along the side of the cargo carrier, including a side door, and the front of the vehicle.

6 Claims, 5 Drawing Figures

INVENTOR
MERRITT A. ROBINSON
By Warren, Rubin, Brucker
& Chickering
ATTORNEYS

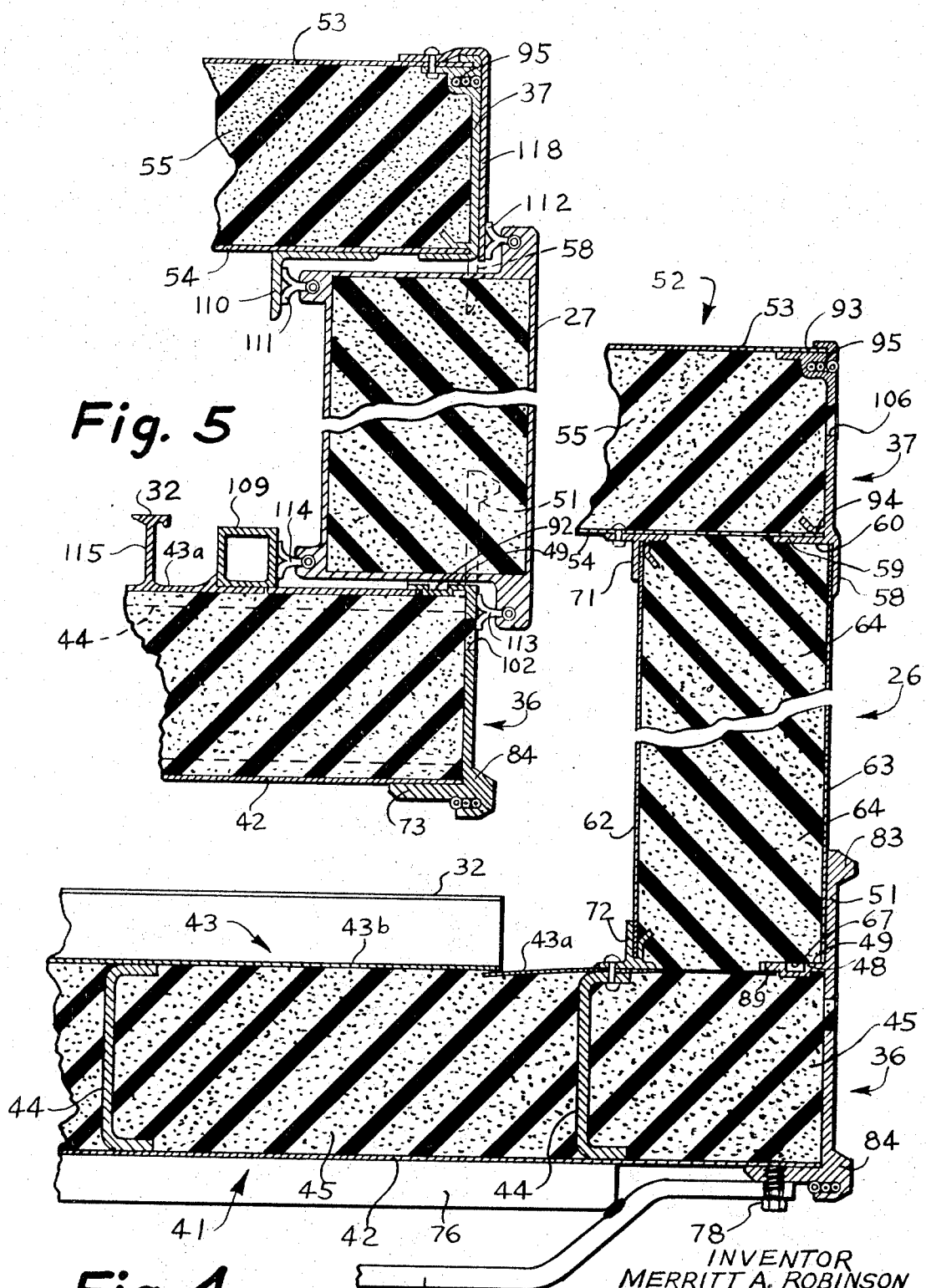

CARGO CARRYING VEHICLE CONSTRUCTION

BACKGROUND OF THE INVENTION

There has been considerable effort in recent years in the development of cargo carrying trailer bodies for use in the trucking industry. More particularly, considerable effort has been directed toward the use of foamed plastics of various kinds in the formation of panels for trailer bodies. Typical of the basic work that has taken place in connection with the formation of these panels are U.S. Pat. Nos. 3,472,728, 3,470,058, 3,481,642, and 3,003,810. In addition, various structural elements which are used in cooperation with foamed panels have been employed. Typical of these elements are rub rails and top edge extrusions, as is shown in U.S. Pat. Nos. 3,141,697 and 3,353,863.

While the above referenced inventions have been effective to various degrees in solving some of the problems of providing a cargo carrying body construction for a vehicle, such as a truck trailer, certain problems and goals remain only partly solved or achieved. There is still a need for reducing the weight of the vehicle body while maintaining its strength and durability. Some efforts at maintaining the desired strength of the cargo carrying body have resulted in constructions which create heat transfer problems and are unsuitable for use as a refrigerated cargo carrier. Still further, some foamed panel vehicle body constructions require many different types of panels and panel constructions, resulting in an increased cost of formation and assembly.

Accordingly, it is an object of the present invention to provide a cargo carrying vehicle body construction which may be more easily and economically manufactured and assembled and has greater simplicity and a multi-purposeness of its components.

It is another object of the present invention to provide a cargo carrying vehicle body construction which is durable and strong and yet lightweight.

SUMMARY OF THE INVENTION

Briefly, the cargo carrying vehicle body construction of the present invention includes, foamed floor, side wall and roof panels, with the floor and roof panel having a rub rail and roof edge element, respectively, secured thereto. The rub rail is multi-purposed in that it provides a shoulder for securement of the side wall panel, forms the end wall of the floor for foaming of the floor in place, provides wire-ways, and may be secured to the under carriage of the trailer. The roof edge element similarly acts as a structural element for securement of the side wall panels, acts as an end closure for the roof panel, and provides a wire-way for the electrical system. The rub rail and roof edge element are formed so that the side wall panels may be used on either side of the cargo carrying body of the vehicle by merely inverting the panel, reducing the number of different panel constructions required. The rub rail and roof edge element can be formed as extrusions, can be easily modified to accommodate side doors and can be used on the front of the body of the vehicle, reducing the number of different extrusions required.

BRIEF DESCRIPTION OF THE DRAWINGS

FIG. 4 is an enlarged, fragmentary, cross-sectional view taken along the plane of line 4—4 of FIG. 2.

FIG. 5 is an enlarged, fragmentary, cross-sectional view taken along the plane of line 5—5 of FIG. 2.

DESCRIPTION OF THE PREFERRED EMBODIMENT

Figure 1:
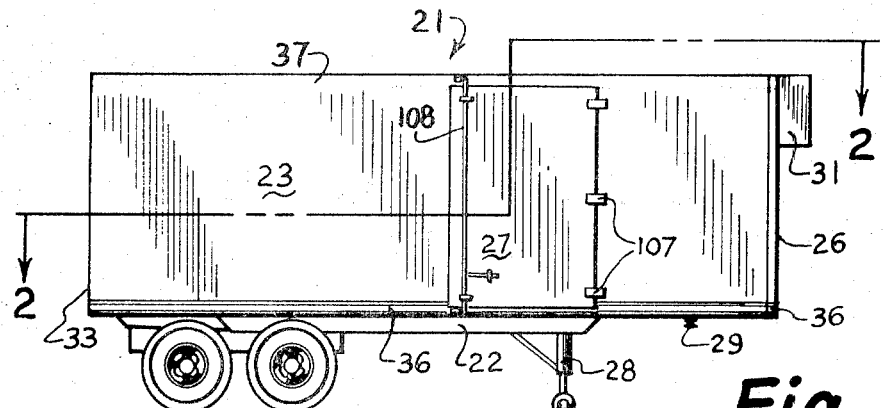
FIG. 1 is a side elevational view of a cargo carrying vehicle body constructed in accordance with the present invention.
Figure 2:
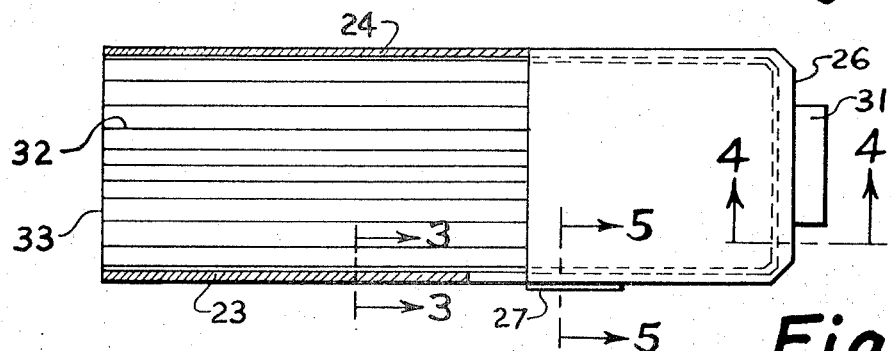
FIG. 2 is a top view, partially in cross-section, taken along the plane of line 2—2 of FIG. 1.

Referring preliminarily to FIGS. 1 and 2, there is illustrated a trailer of the type generally in wide spread use in the heavy trucking industry. The trailer here illustrated is a refrigerated trailer having a body, generally designated 21, which includes an under carriage framework 22 on which a floor is secured, with side panels 22 and 24, as well as front panel 26, being secured to the floor. The trailer is formed with a side door 27, landing gear 28, and a king pin 29. The trailer is provided with a refrigeration unit 31 and special flooring 32 to allow circulation of air beneath the goods, as more fully set forth hereinafter. Additionally, end 33 of the trailer is normally provided with a pair of doors (not shown) similar to door 27 in order to provide access to the cargo at end 33. As thus far described, the trailer of the present invention is constructed in accordance with standard practice in the industry.

In order to provide a trailer construction which may be rapidly assembled and in which the components are easily formed, it is a feature of the present invention to form the trailer with a unique rub rail, generally designated 36, and roof edge element, generally designated 37, which in turn allow the side wall panels 23, 24 and 26 to be advantageously formed. Referring now to FIG. 4, the over-all combination of the roof, side wall and floor panel constructed in accordance with the present invention is shown, although it will be noted that the side wall panel is, in this instance, front panel 26. Each of side walls 23 and 24 are formed of panels constructed as shown in connection with panel 26 and are connected to the floor and roof panels in an analogous manner.

In order to provide the desired insulating properties while maintaining strength, the floor panel, generally designated 41, is formed as a foamed member including a pair of spaced apart skin elements 42 and 43. In this instance upper element 43 is comprised of a flexible fiberglass member 43a, and the lower surface of the refrigerator floor 43b. The skin elements are supported in spaced relation by and secured to reinforcing C-shaped channels 44 and a foamed plastic material 45.

In order to enclose the end wall of the floor panel and to provide a structural element to which the undercarriage of the trailer and the side walls may both be secured to, longitudinally extending rub rail 36 is secured to and encloses floor panel 41 along edge 47 thereof. As best may be seen in FIG. 1, rub rail 36 extends over the length of the trailer, and it additionally extends across the front thereof. As will be set forth more fully hereinafter, foamed material 45 may be formed of prefoamed sheets which fill the interstices between channels 44 and between the channels and rub rail 36. It is preferable, however, to foam the plastic material in situ, which gives better bonding and cohesiveness to the floor panel. Extending inwardly of rub rail 36 is a longitudinally extending flange 48 which overlaps a portion of the top floor element 43a. Flange 48 extends over the entire length of the rub rail and is formed with an upwardly facing shoulder 49 for support of side wall panel 26. In addition, and in order to better support side wall panel 26, the rub rail is formed with a side wall panel receiving portion 51 extending vertically above flange 48 for securement of the side wall panel thereto.

The roof panel is formed in a manner similar to the floor panel, although it does not require reinforcing elements. Thus, roof panel 52 includes a pair of relatively spaced apart skin elements 53 and 54 supported in spaced relation and secured to a foamed plastic material 55. Again, foamed material 55 may be foamed-in-place or formed of pre-foamed and cut material. It should be noted further that various types of foamed materials are suitable for the panels for the present invention; however, polyurethane foam having a density of about 2.0 pounds per cubic foot has been found to be highly advantageous in that it adhers with substantial strength to both plastic and metallic members, and particularly skin elements, has good strength to weight characteristics, and is one of the most efficient insulators known.

In order to enclose the roof panel and further provide a means of connecting the side wall panels thereto, edge 57 of the roof panel is secured to roof edge element 37. Again, the roof edge element extends longitudinally over the length of both sides of the trailer and across the front thereof. The construction of the rub rail and roof edge element provide sufficient flexibility so that a single extrusion for each of these elements can be used on both sides and the front of the trailer.

Roof edge element 37 includes a downwardly depending flange 58 for securement to side wall panel 26 and an inwardly extending flange 59 overlapping a portion of the skin 54 of roof panel 52. Flange 59 projects below the roof panel and provides a downwardly facing shoulder 60 for support of said roof panel on side wall 26.

Roof edge element 37 is further formed with longitudinally extending sockets 93 and 94 for receipt of roof panel skin elements 53 and 54 therein. Wire-way 95 is preferably formed as a part of the upper socket 93.

Side wall panel 26 similarly includes skin elements 62 and 63 supported in relatively spaced relation by and secured to a foamed plastic material 64. Formed in the top and bottom edges of panel 26 are longitudinally extending notches 66 and 67 which project inwardly of outer skin element 63 and are formed to a depth at least equal to the greatest height to which inwardly extending flanges 59 and 48 project above and below the respective floor and roof panels. Notches 66 and 67 are further formed to extend inwardly of outer skin element to a distance at least equal to the greatest distance to which the inwardly extending flanges 59 and 48 project from the outer skin element 63. Side wall panel 26 is secured to the roof and floor panels by adhesive and/or mechanical fasteners between skin element 63 and flanges 58 and 51 and additionally by fastening elements 71 and 72. The upwardly and downwardly facing shoulders 60 and 49 are seated in notches 66 and 67, respectively, upon securement of panel 26 to the floor and roof panels.

The combination of the notched side wall panels and the upwardly and downwardly facing shoulders of the floor and roof panels allow side wall panel 26 to be used on either side of the trailer and at the front end thereof. Thus, in the manufacture of panels, a single panel construction can be used. In order to use panel 26 on both sides of the trailer body, as well as shown in FIG. 4 on the front of the trailer, the panel may merely be positioned on one side of the trailer, and inverted, that is, rotated 180° about a horizontal and longitudinally extending axis through the center of the panel, and installed on the opposite side of the vehicle. Upon inversion of panel 26, side wall 63 remains outwardly facing and wall 62 remains on the inside of the panel. It is preferable to form wall 63 as an aluminum skin for greater durability and to form wall 62 of a plastic or fiberglass material. Thus, formation of notches 66 and 67 to receive the largest of the two inwardly extending flanges allows inversion of the panel and its use throughout the trailer. As will be readily appreciated, it is preferable and a feature of the present invention to form flanges 48 and 59 so as to extend inwardly to substantially the same position and to extend above and below the respective floor and roof panels, to substantially the same height so that notches 66 and 67 may be formed to have substantially the same transverse cross-section.

In order to secure rub rail 36 to floor panel 41, it is preferable to form the rub rail with a second or lower inwardly extending flange 73 which underlies skin element 42 and may be adhesively secured thereto. It is a feature of the present invention to facilitate the rapid assembly and construction of the trailer body that adhesive securement of the components be employed wherever possible. Thus, it is preferable to form flange 73 and additionally flanges 51, 58 and 59 to extend adjacent the respective skin elements to a distance equal to at least 10 times the thickness of the skin element, whereby adhesives may be used to give a bond between the elements approaching a strength of the skin element alone. It is further preferable to form the respective flanges to extend adjacent the skin elements to a distance on the order of about 25 to 50 times the thickness of the skin element to provide an added safety factor. At the front of the trailer body of the present invention, flange 73 may further be used to tie the flange to the under carriage of the trailer. Thus, under carriage members 76 and 77 are secured by fastener 78 to flange 73, and the rub rail further acts to tie the trailer body to the under carriage.

Figure 3:
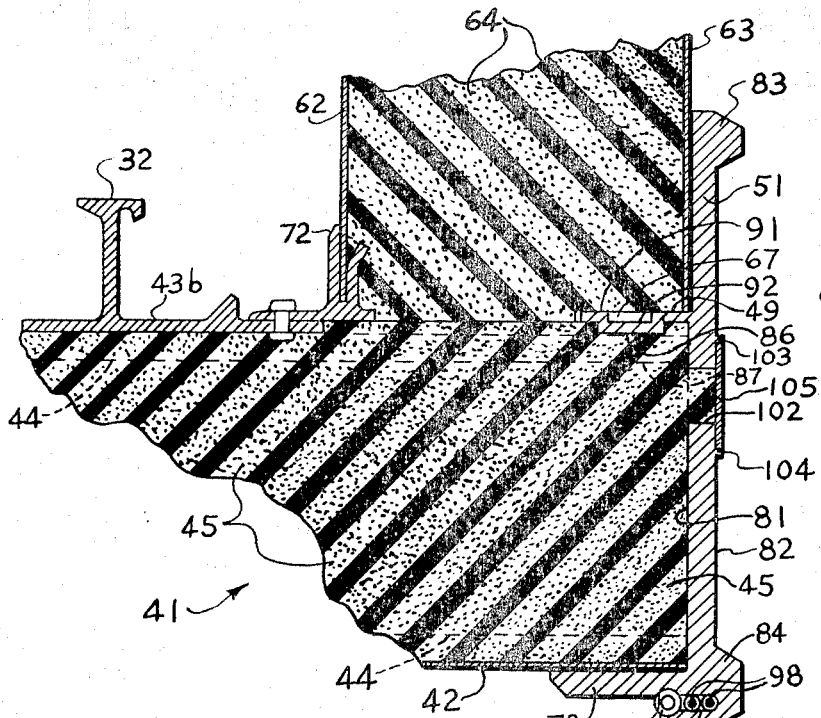
FIG. 3 is an enlarged, fragmentary, cross-sectional view taken along the plane of line 3—3 of FIG. 2.

Referring now to FIG. 3 additional features of advantage of the rub rail of the present invention may be set forth in more detail. As seen in FIG. 3, the rub rail has a main body portion having inwardly facing side 81 abutting edge 47 of the floor panel and outwardly facing side 82 from which an upper and lower rub rail portion 83 and 84 project. Rub rail portions 83 and 84 act as a protective strip tending to shield the side wall panels from direct impact with various objects. Additional rub rail portions can be provided on the body of the extrusion 36.

In order to provide for dimensional variations in the structural members of the floor panel, it is preferable that the rub rail be formed so that upper flange 48 is formed for resilient upward displacement away from lower flange 73. This is preferably effected by providing an inwardly projecting and downwardly facing surface 86 which is superimposed over and contacts a substantial area of an upper element 87 of the floor. In this case element 87 is a flange on C-shaped channel 44. Disposed between surface 86 and leg 87 of channel 44 is an adhesive material. It will be noted that flange 48 is relatively thin in cross-section and surface 86 is disposed in inwardly spaced relation to the body of rub rail 36, allowing an upward flexing to accommodate dimensional variations in channel 44. Additionally, in order to allow the rub rail to be used at the front of the trailer, a second downwardly facing surface 89 is formed adjacent the inner end of flange 48, with surface 89 being displaced upwardly from surface 86 for receipt and securement of upper skin element 43a, (best seen in FIG. 4) thereto. Additionally, upper flange element 48 is preferably formed with a pair of upwardly facing shoulders 91 and 49 disposed at substantially the same vertical height and separated by a longitudinally extending notch 92, with shoulders 91 and 49 and notch 92 providing a traction surface at the side door of the vehicle which is best seen in FIG. 5 and more fully set forth hereinafter.

A reoccurring problem in the construction of heavy duty trailer bodies is the provision of wire-ways in order to allow for the rather substantial lighting requirements which most trailers have. In the present invention it is further preferable to form the rub rail and roof edge element to provide wire-ways. Thus, the body of rub rail 36 is formed with a longitudinally extending channel 96, which extends over the length of the rub rail and which has an open end 97 for insertion of wires 98 therein. End 97 is further formed with an O-ring receiving seat 99 in which longitudinally extending O-ring 100 is positioned. As seen in FIGS. 4 and 5, roof edge element 37 is similarly provided with a wire-way 95 therein.

In order to facilitate foaming of the roof and floor panels in situ the rub rail and roof edge element are both preferably formed with a plurality of longitudinally spaced openings 102 (best seen in FIGS. 3 and 5) through which a foam injecting nozzle may be inserted. Since channels 44 run across the trailer from side to side, injection of foam is normally accomplished by inserting the foaming nozzle through openings in the side rub rails, and the front rub rails need not be formed with opening 102. Once the foam has formed in place, a certain portion of the foam will be extruded back out opening 102 and that may be trimmed off. The rub rail is preferably additionally formed with longitudinally extending ribs 103 and 104 projecting from side 82 above and below opening 102. The ribs are formed for receipt of a closure tape 105 mounted therebetween and adhesively secured to the rub rail intermediately of the openings to affect closure of the openings. Similar openings 106 may be formed in the roof edge element and upper and lower ribs for receipt of a closure tape employed.

The versatility of the rub rail and roof edge element extrusions of the present invention is particularly well illustrated in their adaptability to the placement of a side door in the trailer. Thus, referring to FIG. 5, the roof edge element and rub rail can be easily modified to accommodate side door 27. This is accomplished merely by severing portion 51 (illustrated in dotted lines) at shoulder 49 of the rub rail. Similarly the downwardly depending flange 58 is severed from the roof edge element over a vertically aligned longitudinally extending length of the vehicle as determined by the width of door 27. Side door 27 is hinged as shown in FIG. 1 by hinges 107 and is locked by closure mechanism 108 in a standard fashion. Additionally, a longitudinally extending square tubular element 109 is preferably secured to the refrigerator floor 43a, such as by welding. In a similar manner an L-shaped longitudinally extending flange 110 is secured to roof panel 52. The upper and lower edges of the door are provided with Y-shaped resilient sealing members 111–114 secured to door 27. Thus, the sealing members seal against the L-shaped flange and the tubular channel as well as the outside of the rub rail and the outside of element 118, which forms a facing over the roof edge element, providing a double seal around the periphery of the door. This is very advantageous when a refrigerated trailer is to be constructed.

As was hereinbefore noted, notch 92 in the rub rail affords a traction surface so that a fork lift may enter the vehicle and seep up onto tubular member 109 and subsequently to the top of the refrigerator floor 32. The upstanding floor flange 115 to top surface 32 of the floor allows circulation of air beneath the cargo stored on top of the top surface. The door 27 can be advantageously formed of foamed material in a manner analogous to the side wall. It should be noted further in connection with side wall 26, that these walls are formed on jigs in which the foamed material 64 is foamed-in-place and the forms which define the top and bottom edges are stripped away. Thus, as shown in FIG. 3, there is a foam interface 116 between the foam of the side wall 64, which is secured to the floor before foaming the floor, and the foam 45 of the floor. At the front of the vehicle, the interface 15 between fiberglass panel 43a and the bottom of foam 64, and in FIG. 5 a fiberglass insert 117 is used to close the gap between floor 43a and flange 48 at the door. Thus, there is never any direct connection between the metal, preferably aluminum, rub rail extrusion and the refrigerator floor or interior of the trailer. Similarly, the aluminum extrusion which provides the roof edge element does not extend to the interior of the vehicle, minimizing heat transfer through the joints of the roof panel to the side wall and side wall to the floor panel. It should be noted further that the roof edge elements and rub rail afford sockets or flanges which in each case enclose the edges of the skin elements to which they are secured. Thus, the edges of the skins of the panels are not exposed and cannot be pulled away from the rest of the panel. Moreover, foaming the panels in place results in the foam tending to expand and maintain the seal between the skins and the rub rail and roof edge element.

I claim:

1. In a structural element of the rub rail and roof edge element type for use in a cargo carrying vehicle, said structural element including an elongated main body portion formed to extend along a side of the vehicle, upper and lower flange portions formed to extend laterally inwardly from said main body portion at relatively vertically spaced heights on said main body portion to define with the inwardly facing surface of said main body portion an edge closure for a horizontally extending panel, and a vertically extending flange for securement of a vertically extending panel thereto, the improvement comprising:

a plurality of openings extending through said main body portion from the outwardly facing side thereof to said inwardly facing side at longitudinally spaced apart positions along the length of said structural element, said openings being formed and dimensioned for insertion of a tool therethrough for deposit of a foam forming composition into said horizontally extending panel interiorly of said structural element to enable foaming of said horizontally extending panel through said structural element with said structural element in place to define the edge of said horizontally extending panel, and said main body portion being formed with longitudinally extending ribs projecting outwardly from the outwardly facing surface of said main body portion at positions above and below said openings for receipt and positioning of an adhesive tape element therebetween.

2. In a structural element of the rub rail and roof edge element type for use in a cargo carrying vehicle, said structural element including an elongated main body portion formed to extend along a side of the vehicle, at least one flange portion formed to extend laterally inwardly from said main body portion for securement of a horizontally extending panel thereto, and a vertically extending flange portion for securement of a vertically extending panel thereto, the improvement comprising:

said main body portion being formed with a longitudinally extending channel formed for mounting of a plurality of wires therein and having a longitudinally extending opening facing away from the exterior of the vehicle and providing an access to said channel over the length thereof, said opening being dimensioned for insertion of said wires into said channel and said longitudinally extending opening being formed to provide an O-ring receiving seat to allow securement of said wires in said channel by positioning of an O-ring in said seat.

3. In a rub rail for use as a structural element in a cargo carrying vehicle, said rub rail including an elongated main body portion formed to extend along a side of the vehicle, a longitudinally extending rub rail portion projecting laterally from an outwardly facing side of said main body portion, and a longitudinally extending lower flange portion formed to extend from an inwardly facing side of said main body portion to a position beneath a structural, element of the floor of said vehicle, the improvement comprising:

a longitudinally extending upper flange portion formed to extend from the inwardly facing side of said main body portion at a vertically spaced distance above said lower flange portion, said upper flange portion being resiliently upwardly displaceable and formed with a downwardly facing surface formed for superimposition over and contact with an upper structural element of the floor of said vehicle and a second downwardly facing surface adjacent the inner end of said upper flange, said second surface being disposed adjacent and on a plane vertically above said first named surface and formed for receipt and securement of an upper skin element thereto.

4. A rub rail as defined in claim 3 wherein, said upper flange portion is formed with a pair of relatively laterally spaced apart upwardly facing longitudinally extending shoulders disposed at substantially the same vertical height and defining a longitudinally extending notch, said shoulders and said notch providing a traction surface at a side door of said vehicle for passage of loading equipment thereover.

5. In a cargo carrying vehicle body suitable for transportation of refrigerated cargo and having a thermally insulated floor panel, a longitudinally extending metallic rub rail secured to said floor panel and formed with a vertically extending side wall receiving portion extending upwardly to a position above said floor panel and an inwardly projecting and longitudinally extending flange portion providing an upwardly facing shoulder projecting above said floor panel, a plurality of thermally insulating side wall panels mounted side-by-side on said upwardly facing shoulder and secured to said side wall receiving portion of said rub rail, a thermally insulating roof panel mounted on said side wall panels in superimposed relation to said floor panel, a longitudinally extending metallic roof edge element secured to said roof panel and formed with a downwardly depending flange extending to a position below said roof panel and an inwardly projecting and longitudinally extending flange portion providing a downwardly facing shoulder projecting below said roof panel, said side wall panels being secured to said downwardly depending flange, the improvement comprising:

said side wall panels having a greater thickness than the distance to which said inwardly extending flanges on said rub rail and said roof edge elements project, and said side wall panels being formed with substantially identical longitudinally extending upwardly and downwardly stepped notches in the top and bottom edges thereof, said notches extending inwardly from the outside surface of said side panels a distance greater than said inwardly extending flanges and less than the thickness of said side panels, and said notches extending upwardly and downwardly a distance greater than the distances to which said upwardly facing shoulder projects above said floor panel and said downwardly facing shoulder projects below said roof panel, whereby said side panels can be used on either side of said vehicle by inverting the same about a horizontal longitudinal axis thereof.

6. A cargo carrying vehicle as defined in claim 5 wherein, said vertically extending side wall receiving portion and said downwardly depending flange are each severed from said rub rail and said roof edge element to a position about flush with said floor panel and said roof panel, respectively, over a vertically aligned, longitudinally extending length of said vehicle, said side wall panels defining an opening therebetween in alignment with the cutaway portion of said rub rail and said roof edge portion for receipt and mounting of a side door therein.

* * * * *